(12) United States Patent
Penkkimäki

(10) Patent No.: US 9,902,090 B2
(45) Date of Patent: Feb. 27, 2018

(54) AIR VENTING VALVE

(71) Applicant: WD RACING OY, Siuro (FI)

(72) Inventor: Pekka Penkkimäki, Siuro (FI)

(73) Assignee: WD RACING OY, Siuro (FI)

( * ) Notice: Subject to any disclaimer, the term of this patent is extended or adjusted under 35 U.S.C. 154(b) by 0 days.

(21) Appl. No.: 14/772,333

(22) PCT Filed: Mar. 21, 2014

(86) PCT No.: PCT/FI2014/050207
§ 371 (c)(1),
(2) Date: Sep. 2, 2015

(87) PCT Pub. No.: WO2014/147296
PCT Pub. Date: Sep. 25, 2014

(65) Prior Publication Data
US 2016/0009004 A1   Jan. 14, 2016

(30) Foreign Application Priority Data

Mar. 22, 2013 (FI) ...................................... 20135278

(51) Int. Cl.
*B29C 33/10* (2006.01)
*F16K 27/02* (2006.01)
(Continued)

(52) U.S. Cl.
CPC .......... *B29C 33/10* (2013.01); *B29D 30/0606* (2013.01); *F16K 1/36* (2013.01);
(Continued)

(58) Field of Classification Search
CPC ............ B29C 33/10; B29D 2030/0617; B29D 30/0606; F16K 1/36; F16K 24/04; F16K 27/02
(Continued)

(56) References Cited

U.S. PATENT DOCUMENTS 1,556,848 A * 10/1925 Kruger .................... F16K 23/00
251/147
D404,464 S    1/1999 Niemczyk
(Continued)

FOREIGN PATENT DOCUMENTS

DE    40202339-0003    7/2002
EP    2 524 787 A1    11/2012
(Continued)

OTHER PUBLICATIONS

International Search Report issued in PCT/FI2014/050207, dated Jun. 24, 2014.
(Continued)

*Primary Examiner* — Marina Tietjen
(74) *Attorney, Agent, or Firm* — Birch, Stewart, Kolasch & Birch, LLP

(57) ABSTRACT

An air venting valve for removing air from a vulcanizing mold of a vehicle tire. The air venting valve includes a valve sleeve, an air venting channel arranged inside the valve sleeve, and a movable inner part arranged in the valve sleeve, which includes a stem, the end of which is provided with a valve disc for opening and closing the air venting channel. The valve disc is against a stop surface of the valve sleeve in a closed position of the air venting valve and in an open position at a clearance from the stop surface. Furthermore, the air venting valve includes a spring member for forcing the inner part towards opening position. The front surface of the valve disc comprises a bulge.

9 Claims, 2 Drawing Sheets

Figure 3:
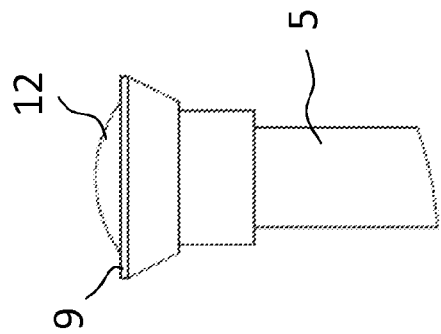

(51) Int. Cl.
*F16K 24/04* (2006.01)
*F16K 1/36* (2006.01)
*B29D 30/06* (2006.01)
*B29L 30/00* (2006.01)

(52) U.S. Cl.
CPC .............. *F16K 24/04* (2013.01); *F16K 27/02* (2013.01); *B29D 2030/0617* (2013.01); *B29L 2030/00* (2013.01)

(58) Field of Classification Search
USPC ........................................................ 251/318
See application file for complete search history.

(56) References Cited

U.S. PATENT DOCUMENTS

| | | |
|---|---|---|
| D413,374 S | 8/1999 | Tine, Jr. |
| D470,221 S | 2/2003 | Niemczyk |
| D576,254 S | 9/2008 | McBroom |
| D669,967 S | 10/2012 | Andersen et al. |
| D685,877 S | 7/2013 | Nemoto |
| D690,391 S | 9/2013 | Garm et al. |
| D706,904 S | 6/2014 | Faraon Chaul Huerta |
| 2012/0027880 A1 | 2/2012 | Cazzanti et al. |

FOREIGN PATENT DOCUMENTS

| | | |
|---|---|---|
| FI | 106938 B | 5/2001 |
| GB | 922788 | 4/1963 |
| GB | 3018778 | 11/2004 |
| JP | 4-123859 A | 4/1992 |
| JP | 2011-116012 A | 6/2011 |
| KR | 30-0476414 S | 1/2008 |
| KR | 10-0957800 B1 | 5/2010 |
| WO | WO DM/062471 | 10/2002 |
| WO | WO 2009/007493 A1 | 1/2009 |

OTHER PUBLICATIONS

Extended Search Report dated Nov. 8, 2016 in corresponding EP Application No. 14770375.5.

* cited by examiner

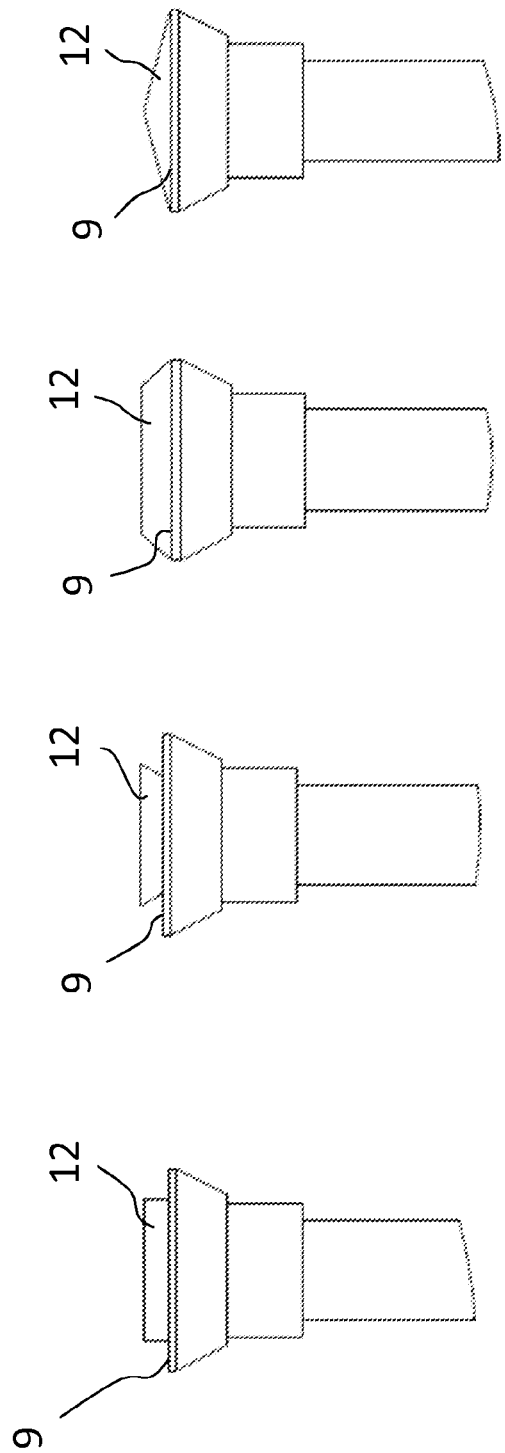

AIR VENTING VALVE

This invention relates to an air venting valve for removing air from a vulcanising mould of a vehicle tyre.

In vulcanising moulds of vehicle tyres, air venting holes or channels are used because, in the vulcanising of a tyre, a tyre blank smaller than the inner dimensions of the mould is placed inside the mould, after which the mould is closed. After closing, the tyre blank is caused to expand, whereby it presses against the surface of the mould in its plastic mode acquiring the size and shape of a tyre. In connection with closing the vulcanising mould, air between the tyre blank and the mould surface has to be removed in order for the surface of the tyre blank to come into a tight contact with the mould surface. There should be several of these air removal holes or channels in order for air to be removed completely at each point of the mould and no air pockets to remain between the tyre and the mould.

An air venting valve typically used in air venting channels in vulcanising moulds of vehicle tyres comprises a stem inside the air venting channel, which stem is thinner than the diameter of the channel, and a valve disc, which is fastened in the stem and is placed in the area of the mould surface. On the inner surface of the mould, there is a stop recess for the valve disc. A coil spring is arranged around the stem which coil spring supports itself in the mould and in the valve disc either directly or via the stem and via a flange fastened to the stem. The spring aims to press the valve disc away from the mould wall towards the tyre blank, whereby air is able to exit from the mould via a clearance between the valve disc and the stop recess and further via a gap between the stem and the air venting channel. As the material being vulcanised, when expanding, advances towards the mould surface, it pushes ahead of it the valve disc, which then finally presses tightly in the stop recess closing the air channel, whereby the material being vulcanised cannot access the air venting channel. The spring then opens the valve while the tyre blank is being removed from the mould.

A disadvantage of the solution described above is that the material being vulcanised is soft, whereby material might pass the valve disc towards the air venting channel before the valve disc is closed. The material being vulcanised thus blocks the valve and prevents it from closing.

The aim of the present invention is to provide an air venting valve, which eliminates the problem described above.

The aim according to the invention is achieved as described in claim 1. An air venting valve according to the invention comprises a valve sleeve, an air venting channel arranged inside the valve sleeve, and a movable inner part arranged in the valve sleeve, which inner part comprises a stem, an end of which is provided with a valve disc for opening and closing the air venting channel. The valve disc is against a stop surface of the valve sleeve in a closed position of the air venting valve and in an open position at a clearance from said stop surface. Furthermore, the air venting valve comprises a spring member for forcing the inner part towards the open position. A front surface of the valve disc is provided with a bulge.

With the solution according to the invention, significant advantages are achieved. The bulge in the front surface of the valve disc causes the air venting valve to close sooner than normally, whereby no material being vulcanised passes the valve disc into the air venting channel before the air venting valve is closed. In that way the air venting valve is prevented from being blocked. With the aid of a bulge an impression, e.g. a logo, of a desired shape, can be made to the material being vulcanised by shaping the bulge appropriately.

Figure 1:
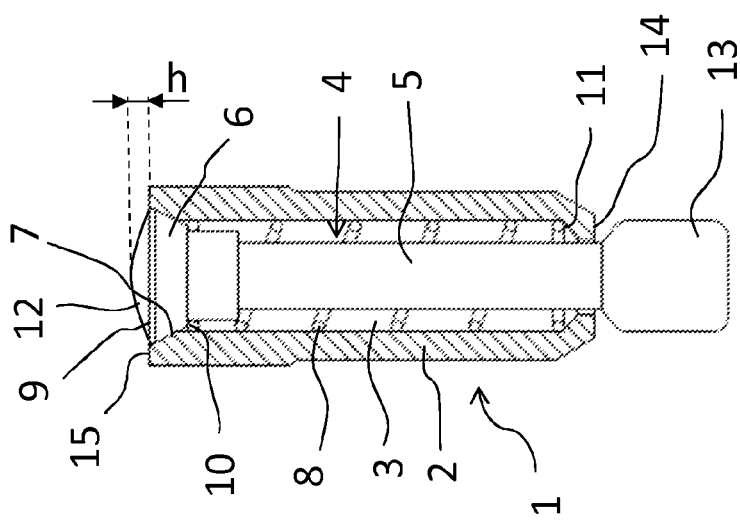

In the following, the invention will be described in more detail by means of examples with reference to the attached drawings, wherein FIG. 1 presents one embodiment of an air venting valve according to the invention, and FIGS. 2-7 present different inner parts of the valve that can be used in the air venting valve of FIG. 1.

The inner surface of a vulcanising mould of a vehicle tyre provides a vulcanised tyre its outer surface shape and tread patterns with their details in the tread area. Thus, on the mould surface of the vulcanising mould, which shapes the tread there are, inter alia, bulges forming tread grooves and recesses forming pattern parts. In the vulcanising mould there are a number of air venting valves 1 through which air from between the tyre blank and mould surface can be removed. There are different numbers of air venting valves 1 in vulcanising moulds of vehicle tyres depending on the size and type of the tyre. For example, there are generally 1200-2000 and 2000-4500 air venting valves 1, respectively, in the summer and winter tyres of passenger cars.

FIG. 1 presents an air venting valve 1 for removing air from a vulcanising mould of a vehicle tyre. The air venting valve 1 comprises a valve sleeve 2. The valve sleeve 2 is of cylindrical shape, its outer surface is smooth or provided with outer threads. An air venting channel 3 is arranged inside the valve sleeve 2 for removing air from between the tyre blank and mould surface. The air venting channel 3 extends through the wall of the vulcanising mould from inside of the mould to outside of the mould.

The air venting valve 1 comprises also a movable inner part 4 arranged in the valve sleeve 2, comprising a stem 5 the end of which is provided with a valve disc 6 for opening and closing the air venting channel 3. A stop surface 7 is arranged in the valve sleeve 2 for the valve disc 6. The valve disc 6 is in a closed position of the air venting valve 1 against the stop surface 7 and in an open position at a clearance from said stop surface 7. In the open position the valve disc 6 protrudes from an end 15 of the valve sleeve 2. The valve disc 6 comprises a front surface 9, which is directed towards the inner part of the vulcanising mould and which comes in contact with outer face of the tyre blank while the air venting valve 1 is closing. The tyre material, when expanding, thus forces the air venting valve 1 towards the closing position. The other end of the stem 5 in the inner part is provided with a projecting part 13, which is adjusted to support itself on the other end 14 of the valve sleeve 2 while the air venting valve 1 is in open position. The projecting part 13 thus limits the movement of the inner part 4 in the open position. The maximum stroke of the air venting valve 1, i.e. the maximum travel of the inner part 4 is in the longitudinal direction 0.2-0.5 mm.

The air venting valve 1 comprises a spring member 8 for forcing the inner part 4 towards the open position. The spring member 8 is arranged inside of the valve sleeve 2 between a back surface 10 of the valve disc 6 and a support surface 11 arranged in the valve sleeve 2. The spring member 8 is arranged around the stem 5 of the inner part. The spring member 8 can be e.g. a coil spring.

The front surface 9 of the valve disc 6 is provided with a bulge 12, which causes the air venting valve 1 to close sooner than normally. Then the material being vulcanised does not pass the valve disc into the air venting channel 3 before the air venting valve is closed. In that way the air venting valve is being prevented from blocking. The height (h) of the bulge 12 is 0.01-1.5 mm, generally 0.5-1 mm. The height (h) of the bulge can be, e.g. 0.1-0.6 mm. The height h is the distance between the end 15 of the valve sleeve and the front point of the bulge in the longitudinal direction of stem 5 while the air venting valve 1 is in a closed position. Different embodiments of the bulge 12 are shown in FIGS. 2-7.

Figure 2:
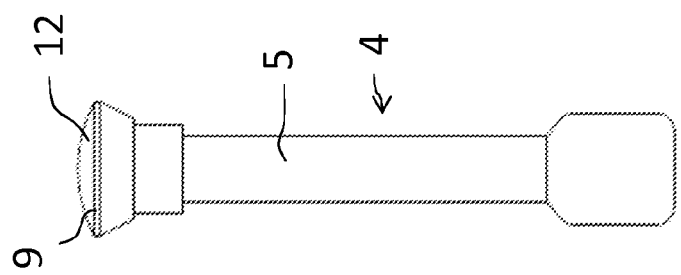

In FIG. 2 the bulge 12 is convex and it extends over the whole area of the front surface 9 of the valve disc.

In FIG. 3 the bulge 12 is convex and it extends only over the part of the front surface 9 area.

In FIG. 4 the bulge 12 is of cylindrical shape.

In FIG. 5 the bulge 12 is of the shape of a truncated cone. The broader end of the bulge 12 is in front.

In FIG. 6 the bulge 12 is of the shape of a truncated cone. The narrower end of the bulge 12 is in front. The bulge 12 extends over the whole area of the front surface 9 of the valve disc.

In FIG. 7 the bulge 12 is of cone apex shape. The bulge 12 extends over the whole area of the front face 9 of the valve disc.

In the closed position of FIG. 1 the whole front surface 9 (bulge 12) of the valve disc 6 protrudes from the valve sleeve 2 (embodiments of FIGS. 2, 6 and 7), or a part of the front surface 9 (bulge 12) protrudes from the valve sleeve 2 and the other part of the front surface 9 is on the same level as the end 15 of the valve sleeve (embodiments of FIGS. 3, 4 and 5). In the embodiments of FIGS. 2, 3, 6 and 7 the bulge 12 narrows towards its top. The air venting valve 1 according to the invention functions for removing air from a vulcanising mould of a vehicle tyre during the vulcanising of a tyre as follows. A tyre blank is set in the vulcanising mould, which tyre blank is caused to expand by pressing air and/or steam inside of it, whereby the outer surface of the tyre blank presses against the mould surface gaining its final surface shape, i.e. the surface pattern of the tyre tread, from it. At the same time, the vulcanising mould is heated for vulcanising the rubber material of the tyre blank and for achieving the finished tyre. In order for the outer surface of the tyre blank to set as precisely as possible against the inner surface of the mould, air is removed from between the tyre blank and the mould surface via air venting valves 1 according to the invention.

The spring member 8 keeps the air venting valve 1 in an open position, whereby air can be removed via the air venting channel 3 from between the tyre blank and the mould surface. As the tyre material, when expanding, advances towards the mould surface, it pushes ahead of it the valve disc 6, which then finally presses against the stop surface 7 thus closing the air channel 3, whereby the tyre material cannot access the air venting channel 3. When the tyre blank is removed from the mould, a spring member 8 moves the inner part 4 to open position.

The bulge 12 in the front surface 9 of a valve disc causes the air venting valve 1 to close sooner than in the ordinary air venting valve (smooth front surface), whereby no material being vulcanised passes the valve disc 6 into the air venting channel 3 before the air venting valve 1 is closed. In that way the air venting valve 1 is prevented from being blocked. With the aid of the bulge 12 an imprint, e.g. a logo, of a desired shape, can be made to the material being vulcanised by shaping the bulge 12 appropriately.

It is obvious to the person skilled in the art that the different embodiments of the invention are not solely limited to the example described above, but they may vary within the scope of the claims presented below. The invention can also be applied to others than the vulcanising moulds of a vehicle tyre.

The invention claimed is:

1. An air venting valve for removing air from a vulcanising mould of a vehicle tire, comprising:
    a valve sleeve;
    an air venting channel arranged inside the valve sleeve;
    a movable inner part arranged in the valve sleeve, the movable inner part comprising a stem, an end of the stem provided with a valve disc for opening and closing the air venting channel, the valve disc contacting a stop surface of the valve sleeve in a closed position of the air venting valve and in an open position at a clearance from said stop surface, the valve disc having a front surface provided with a bulge; and
    a spring member for forcing the inner part towards the open position,
    wherein an edge of the front surface is on a same level as an end of the valve sleeve when the air venting valve is in the closed position,
    wherein a height of the bulge is 0.01-0.6 mm, the height being a distance between the end of the valve sleeve and a highest point of the bulge in a longitudinal direction of the stem when the air venting valve is in the closed position, and
    wherein the bulge extends over the whole front surface area.

2. An air venting valve according to claim 1, wherein the bulge is convex.

3. An air venting valve according to claim 1, wherein the bulge is of the shape of a truncated cone.

4. An air venting valve according to claim 1, wherein the bulge is of a cylindrical shape.

5. An air venting valve according to claim 1, wherein the other end of the stem is provided with a projecting part, which is arranged to support itself to the other end of the valve sleeve while the air venting valve is in the open position.

6. An air venting valve according to claim 1, wherein the bulge narrows towards its top.

7. An air venting valve according to claim 2, wherein the other end of the stem is provided with a projecting part, which is arranged to support itself to the other end of the valve sleeve while the air venting valve is in the open position.

8. An air venting valve according to claim 3, wherein the other end of the stem is provided with a projecting part, which is arranged to support itself to the other end of the valve sleeve while the air venting valve is in the open position.

9. An air venting valve according to claim 4, wherein the other end of the stem is provided with a projecting part, which is arranged to support itself to the other end of the valve sleeve while the air venting valve is in the open position.

* * * * *